United States Patent
Huang (10) Patent No.: US 7,966,095 B2
(45) Date of Patent: Jun. 21, 2011

(54) COMPUTER-AIDED COLOR PAINT FORMULA ADJUSTING SYSTEM AND METHOD THEREOF

(76) Inventor: Chen-Te Huang, Kaohsiung (TW)

( * ) Notice: Subject to any disclaimer, the term of this patent is extended or adjusted under 35 U.S.C. 154(b) by 631 days.

(21) Appl. No.: 12/093,593

(22) PCT Filed: Nov. 15, 2005

(86) PCT No.: PCT/CN2005/001927
§ 371 (c)(1),
(2), (4) Date: May 13, 2008

(87) PCT Pub. No.: WO2007/056889
PCT Pub. Date: May 24, 2007

(65) Prior Publication Data
US 2008/0249716 A1    Oct. 9, 2008

(30) Foreign Application Priority Data
Nov. 15, 2005   (CN) ................. PCT/CN2005/001927

(51) Int. Cl.
*G05B 21/00* (2006.01)
*G06F 9/00* (2006.01)
(52) U.S. Cl. ....................... 700/265; 366/605
(58) Field of Classification Search ............ 700/28–33, 700/51, 96, 97, 117, 233, 265, 266, 282–285; 366/605
See application file for complete search history.

(56) References Cited

U.S. PATENT DOCUMENTS

| | | | | |
|---|---|---|---|---|
| 4,887,217 A * | 12/1989 | Sherman et al. | | 700/117 |
| 5,684,711 A * | 11/1997 | Agrafiotis et al. | | 506/1 |
| 5,689,415 A * | 11/1997 | Calotychos et al. | | 700/67 |
| 6,064,919 A * | 5/2000 | Slusarczyk | | 700/117 |
| 6,073,055 A * | 6/2000 | Jahn et al. | | 700/97 |
| 6,701,193 B1 * | 3/2004 | Filev et al. | | 700/28 |
| 7,069,198 B2 * | 6/2006 | Snyder et al. | | 703/2 |
| 7,827,163 B2 * | 11/2010 | Masuda et al. | | 707/708 |
| 2004/0122648 A1 * | 6/2004 | Ando et al. | | 703/22 |
| 2004/0220773 A1 * | 11/2004 | Nonogaki et al. | | 702/183 |
| 2005/0038557 A1 * | 2/2005 | Friel et al. | | 700/233 |
| 2007/0211936 A1 * | 9/2007 | Dornan et al. | | 382/162 |
| 2009/0099695 A1 * | 4/2009 | Trevino et al. | | 700/265 |

* cited by examiner

*Primary Examiner* — M. N. Von Buhr
(74) *Attorney, Agent, or Firm* — WPAT, PC; Justin King (57) ABSTRACT

A color paint formula adjusting system and the method thereof are provided, which allow a user to log onto with a stand-alone or a network, input color paint and adjust it. By computer-aided computing of mix ratio of resin, the color paint is made satisfactory to restrictive conditions of physical and chemical properties, with the color unchanged, wherein the color paint is manufactured by mixing a plurality of color pastes. And color paste content data and color paint mix ratios are stored in a database. The mixture contents input by the user and the amounts thereof to be added are corrected by color paint formula adjusting system.

14 Claims, 10 Drawing Sheets

The formula adjusting page of the baking coating system
without including filler (I)

| Product number | Product name | Proportion |
|---|---|---|
| DR-PL | Baking A resin (AR) | 85 |
| DS-PL | Baking B resin (BS) | 100 |
| BK004 | Jet Black | 15 |
| BK005 | Transparent Black | 20 |
| BL011 | Distinctive Blue | 100 |

420 Calculating conversion rate

Conversion rate: ______ (kg) 100

FIG. 4a

The formula adjusting page of the baking coating system without including filler (II)

Modified formula – Conversion: 100 Kg

| Product number | Product name | Proportion |
| --- | --- | --- |
| DR-PL | Baking A resin (AR) | 1.4055 |
| DS-PL | Baking B resin (BS) | 57.2176 |
| BK004 | Jet Black | 4.5974 |
| BK005 | Transparent Black | 6.1299 |
| BL011 | Distinctive Blue | 30.6496 |

420
Calculating conversion rate

Conversion rate: 100 (kg)
100

FIG. 4b

The formula adjusting page of the baking coating system including filler (I)

| Product number | Product name | Proportion |
|---|---|---|
| IH-AC | Metallic baking A resin (KA) | 85 |
| DS-PL | Baking B resin (BS) | 250 |
| BL014 | Light Blue | 25 |
| PR038 | Light Blue Pearl Powder | 15 |
| SI013 | Extra-Fine Sparkle AL | 50 |

Calculating conversion rate — 420

Conversion rate: ______ (g) — 100

FIG. 5a

The formula adjusting page of the baking coating system including filler (II)

Modified formula – Conversion: 500 g

| Product number | Product name | Proportion |
|---|---|---|
| IH-AC | Metallic baking A resin (KA) | 358.9562 |
| DS-PL | Baking B resin (BS) | 42.215 |
| BL014 | Light Blue | 27.4524 |
| PR038 | Light Blue Pearl Powder | 16.4715 |
| SI013 | Extra-Fine Sparkle AL | 54.9049 |

$$\text{(f1)} \quad \frac{\text{Total resin solid content for toner powder special resin}}{\text{Value of total resin solid content}} \leq \text{the first limit value D1}$$

$$\text{(f2)} \quad \frac{\text{Each filler value}}{\text{Value of total resin solid content}} \leq \text{the second limit value D2}$$

$$\text{(f3)} \quad \frac{\text{Total value of the filler interacting with each other}}{\text{Value of total resin solid content}} \leq \text{the third limit value D3}$$

$$\text{(f4)} \quad \frac{\text{Total filler value + Total toner powder value}}{\text{Value of total resin solid content}} \leq \text{the fourth limit value D4}$$

$$\text{(f5)} \quad \frac{\text{Total toner powder value}}{\text{Value of total resin solid content}} \leq \text{the fifth limit value D5}$$

$$\text{(f6)} \quad \frac{\text{Total filler value}}{\text{Value of total resin solid content}} \leq \text{the sixth limit value D6}$$

FIG. 7

COMPUTER-AIDED COLOR PAINT FORMULA ADJUSTING SYSTEM AND METHOD THEREOF

BACKGROUND OF THE INVENTION

1. Field of the Invention

The present invention relates to a color paint formula adjusting system and the method thereof, particularly to a system and method for computer-aided correcting color paint formula amounts input by the user.

2. Related Art

Generally, color paints are usually applied to coat on surfaces of objects, such as cement wall, plastic, and metal, and so on, so that they can have different colors. In order to allow the color of the color paint to be adhered onto the surface of the object, some resins (such as acrylic resin, amino resin, and so on) are usually added to the color paint during formulation, thus the color paint will satisfy the restrictive conditions of physical and chemical properties.

The color paint contains a color paste, fillers (such as calcium carbonate, talc powder, pearl powder, and so on), an additive, a solvent, and the resin described above. The color paste is produced by mixing the toner powder with the toner powder special resin (may be a saturated polyester resin) and grinding to some degree of fineness. The toner powder special resin is compatible with other resins, thus being capable of being used with various resins together.

However, when the toner powder special resin is mixed with other resins, the physical properties and the chemical properties, such as adhesion, bending, impact resistance, weather resistance, salt spray resistance, vary with the mixing ratio. Therefore, how to solve such a problem is a common objective in the industry.

SUMMARY OF THE INVENTION

The technical issue to be solved by the present invention is to provide a color paint formula adjusting system and method thereof to establish a correction formula of each paint system, produce different impact degrees according to different mix ratios of resins, and obtain a ratio range through pre-experiments, so as to realize auto-correction of each formula content and quantity of the color paint input by the users.

As described and embodied broadly herein, the present invention provides a color paint formula adjusting system, which can be set for certain paint systems and the color paints of coated objects. The coated objects can be different materials such as metal, plastic, and wood, and so on, on which their surface can be coated by color paints, and includes:

a database, for storing data of a plurality of color paint formulas according to a plurality of restrictive conditions of physical and chemical properties of each paint system and each color paint of coated object, and a mix ratio of the plurality of color paint formulas of each paint system;

an acquiring module, for acquiring a plurality of amounts and units of each color paint formula input by a user;

a query module, for querying the data of each color paint formula input by the user in the database, the data of specific ratios among the resins of the color paints corresponding to each paint system and each color paint of coated object, and the restrictive conditions of each color paint input by the user, wherein the restrictive conditions include:

$$\frac{\text{Total resin solid content value for toner powder special resin}}{\text{Value of total resin solid content}} \leq \text{the first limit value } D1,$$

$$\frac{\text{Each filler value}}{\text{Value of total resin solid content}} \leq \text{the second limit value } D2,$$

$$\frac{\text{Total value of the filler interacting with each other}}{\text{Value of total resin solid content}} \leq \text{the third limit value } D3,$$

$$\frac{\text{Total filler value} + \text{Total toner powder value}}{\text{Value of total resin solid content}} \leq \text{the fourth limit value } D4$$

$$\frac{\text{Total toner powder value}}{\text{Value of total resin solid content}} \leq \text{the fifth limit value } D5, \text{ and}$$

$$\frac{\text{Total filler value}}{\text{Value of total resin solid content}} \leq \text{the sixth limit value } D6,$$

and make a calculation of the theory value of total resin solid content of each input color paint formula, that is, when $$\frac{\text{Total resin solid content value for toner powder special resin}}{\text{Value of total resin solid content}} =$$

the first limit value $D1$, $$\frac{\text{Each filler value}}{\text{Theory value 2 of total resin solid content}} =$$

the second limit value $D2$, $$\frac{\text{Total value of the filler interacting with each other}}{\text{Theory value 3 of total resin solid content}} =$$

the third limit value $D3$, $$\frac{\text{Total filler value} + \text{Total toner powder value}}{\text{Theory value 4 of total resin solid content}} = \text{the fourth limit value } D4$$

$$\frac{\text{Total toner powder value}}{\text{Theory value 5 of total resin solid content}} =$$

the fifth limit value $D5$, and $$\frac{\text{Total filler value}}{\text{Theory value 6 of total resin solid content}} = \text{the sixth limit value } D6,$$

in the theory values of total resin solid content 1~6, the largest theory value thereof is the theory value of total resin solid content.

a statistic module, for calculating and obtaining a plurality of statistic values, such as total resin solid content value for toner powder special resin, each filler value, total value of the filler interacting with each other, total filler value+total toner powder value, total toner powder value, total filler value and so on according to the data from the amount of each color paint formula input by the user, and those statistic values and the value of total resin solid content are compared to obtain the ratio values of $$\frac{\text{Total resin solid content value for toner powder special resin}}{\text{Value of total resin solid content}},$$

$$\frac{\text{Each filler value}}{\text{Value of total resin solid content}}$$

$$\frac{\text{Total value of the filler interacting with each other}}{\text{Value of total resin solid content}},$$

$$\frac{\text{Total filler value} + \text{Total toner powder value}}{\text{Value of total resin solid content}},$$

-continued $$\frac{\text{Total toner powder value}}{\text{Value of total resin solid content}}, \text{ and}$$

$$\frac{\text{Total filler value}}{\text{Value of total resin solid content}}.$$

a comparing module, for determining if each ratio value satisfies each restrictive condition of the physical and chemical properties by comparing each ratio value with the corresponding restrictive condition obtained from the query module, that is, determining weather $$\frac{\text{Total resin solid content value for toner powder special resin}}{\text{Value of total resin solid content}}$$

is less than or equal to the first limit value D1; whether $$\frac{\text{Each filler value}}{\text{Value of total resin solid content}}$$

is less than or equal to the second limit value D2; whether $$\frac{\text{Total value of the filler interacting with each other}}{\text{Value of total resin solid content}}$$

is less than or equal to the third limit value D3; whether $$\frac{\text{Total filler value} + \text{Total toner powder value}}{\text{Value of total resin solid content}}$$

is less than or equal to the fourth limit value D4; whether $$\frac{\text{Total toner powder value}}{\text{Value of total resin solid content}}$$

is less than or equal to the fifth limit value D5; whether $$\frac{\text{Total filler value}}{\text{Value of total resin solid content}}$$

is less than or equal to the sixth limit value D6; and a computing module, for computing of a plurality of adjustment values of each inputting formula according to the mix ratio of each color paint formula. That is to say, among the paint systems and the color paints of coated objects, each resin has its specific ratio when the amounts of toner powder and filler of a color paint input by the user are kept constantly. The plurality of statistic values of total resin solid content value for toner powder special resin, each filler value, total value of the filler interacting with each other, sum value of total filler value plus total toner powder value, total toner powder value, and total filler value and so on are calculated by the statistic module. Those statistic values and the value of total resin solid content are then compared, so as to obtain a plurality of ratio values. Next, the comparing module determines whether each ratio value is less than or equal to each limit value. If not, the theory value of total resin solid content is calculated by the query module. Then among the resins under with specific ratios, adjustment values of each inputting formula is calculated according to the mix ratio of each color paint formula by the value of total resin solid content or the theory value of total resin solid content.

Furthermore, to achieve the objective, the present invention provides a method, which includes the steps of following:

After a user has input and selected setting of a paint system to be used and a color paint of coated object, first, receiving amounts and units of each color paint formula input by a user; next, querying the data of each color paint formula input by the user and each restrictive condition of each color paint in the database; then, integrating the amounts of each color paint formula input by the user into a plurality of statistic values according to the data of each color paint formula, and calculating ratio values for determining the restrictive conditions; afterwards, determining whether each ratio value satisfies each restrictive condition of physical and chemical properties, if not, calculating an adjustment value of each formula according to the mix ratio of each color paint formula.

Hereinafter, the features and practices are illustrated in detail by preferred embodiments with reference to the following drawings.

BRIEF DESCRIPTION OF THE DRAWINGS

The present invention will become more fully understood from the detailed description given herein below for illustration only, and thus are not imitative of the present invention, and wherein.

DETAILED DESCRIPTION OF THE INVENTION

Figure 1:
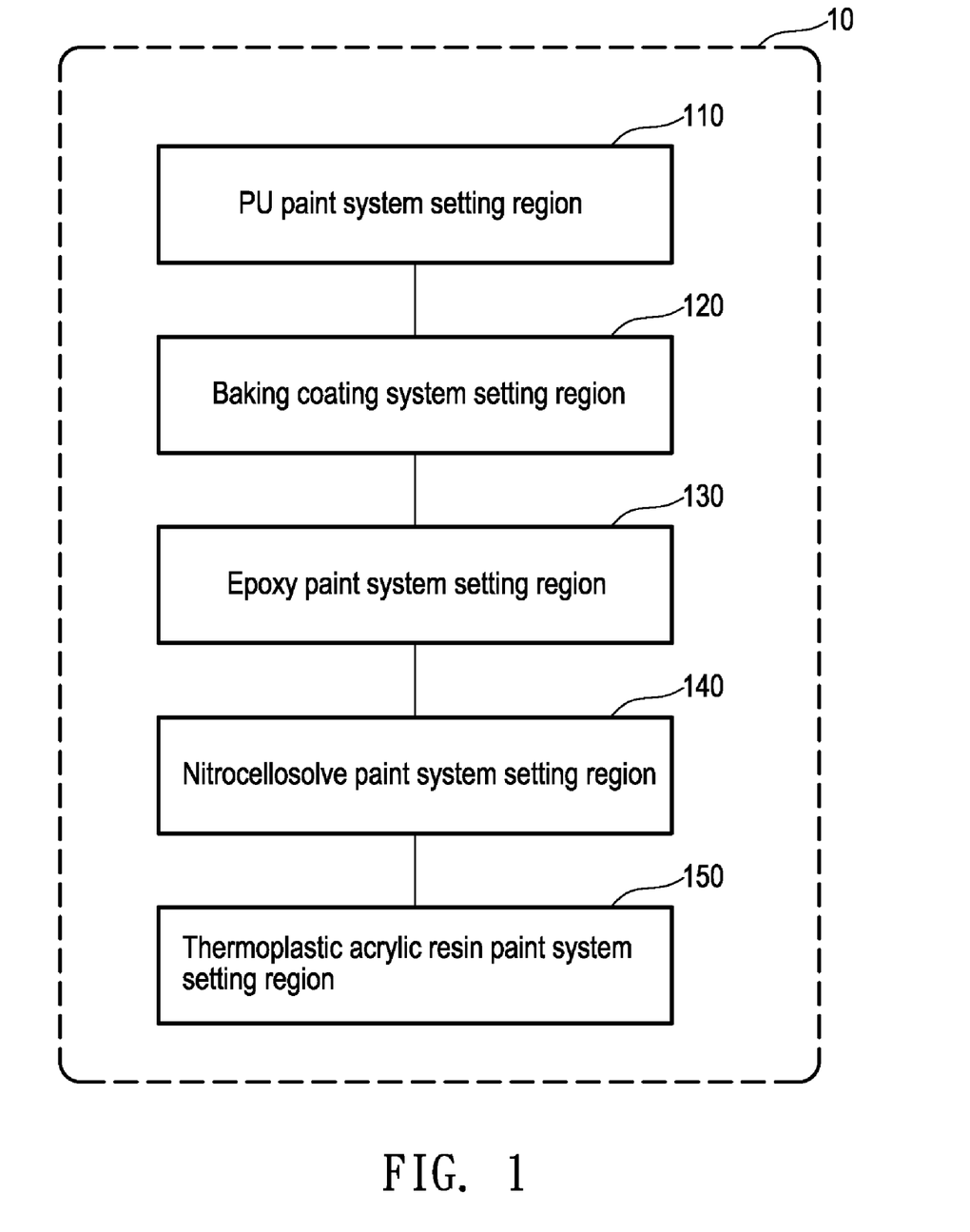
FIG. 1 is a schematic view of setting the present paint system of the present invention.

The present invention provides a color paint formula adjusting system and method thereof. A color paint formula adjusting system 30 of the present invention is used to adjust the color paint formula for different paint systems 10 and the color paints of coated objects to be used, for example, any material capable of being coated such as metal, plastic, wood, and so on. Each main paint system 10 includes the following setting regions, as showed in FIG. 1:

(A) a PU paint system setting region 110: formed by reacting resins containing polyols, such as alkyd resin, acrylic resin, and saturated polyester resin, with polyisocyanate containing NCO.

(B) a baking coating system setting region 120: a baking coating system formed by reacting the resins, such as alkyd resin, acrylic resin, and saturated polyester resin, with amino resin at high temperature.

(C) an epoxy paint system setting region 130: a paint system formed by reacting epoxy resin with amino resin or reacting epoxy resin with polyamide resin.

(D) a nitrocellosolve paint system setting region 140: a paint system formed by mixing the resin with nitrocellosolve; and (E) a thermoplastic acrylic resin paint system setting region 150.

Figure 2A:
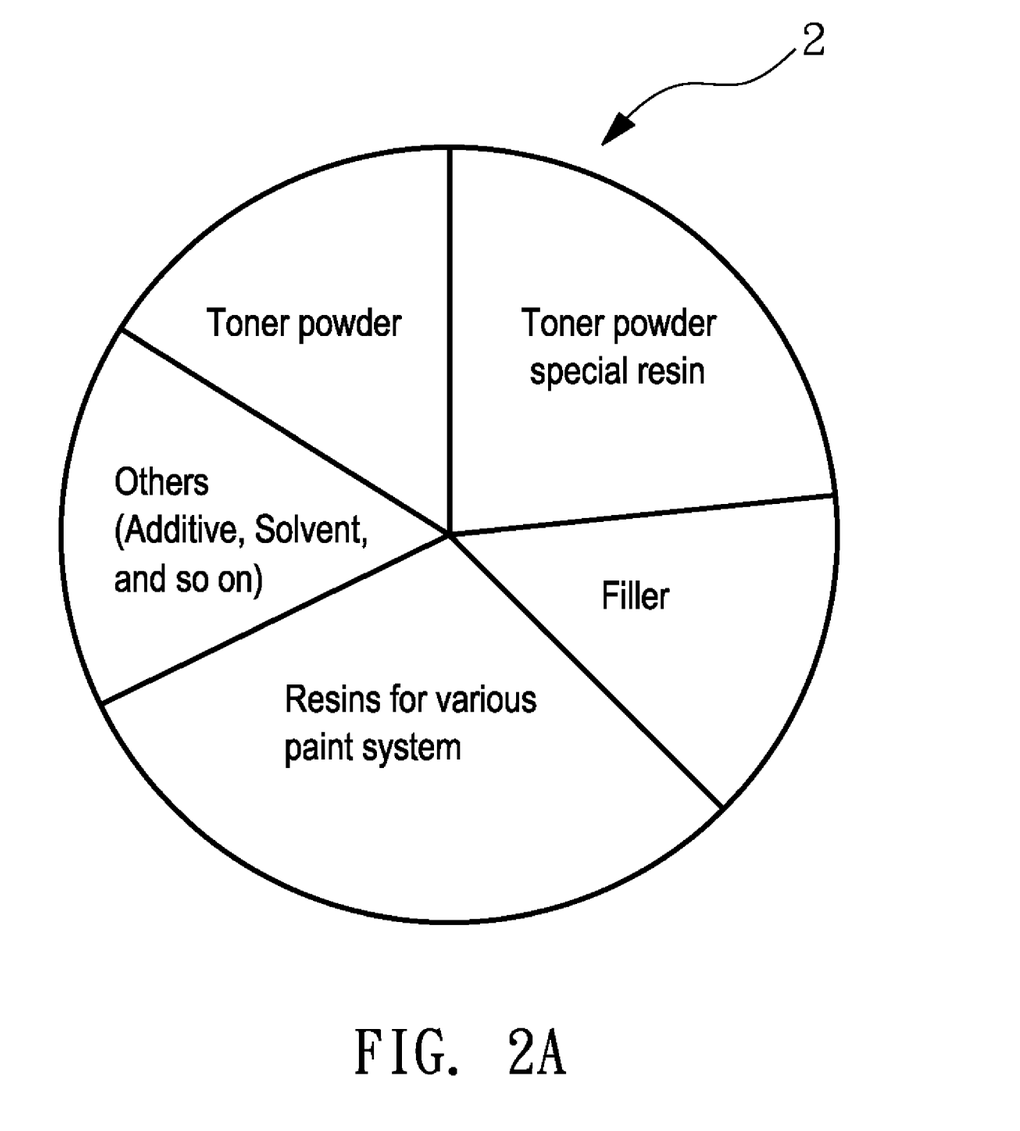
FIG. 2A is a schematic composition of a common content of the paint system of the present invention.
Figure 2B:
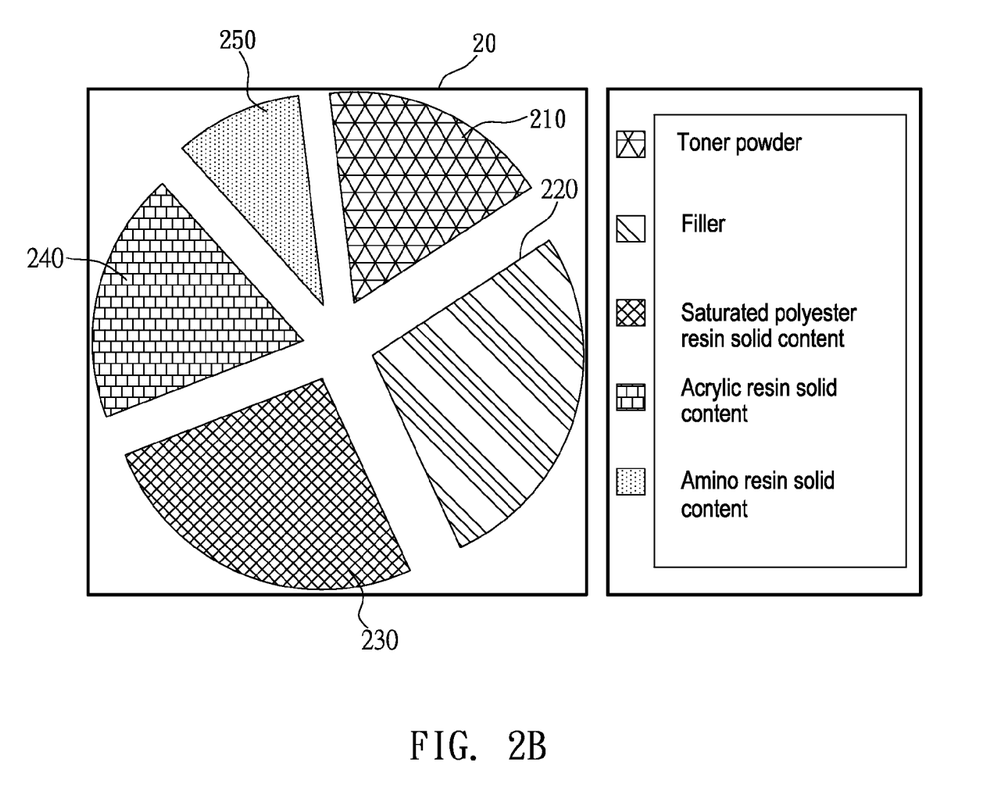
FIG. 2B is a schematic view of compositions of a color paint of the present invention.

As the formulations of the color paints, different paint systems 10 will produce color paints with different physical and chemical properties due to different formula ratios, even if the contents are the same. FIG. 2A is a schematic compounds of the common content 2 of color paint of the paint system. As it mentioned, the compositions of the color paint contain a color paste, fillers (such as calcium carbonate, talc powder, pearl powder, and so on), an additive, a solvent, and various resins, wherein the color paste is produced by mixing the toner powder with the toner powder special resin (may be a saturated polyester resin) and grinding to some degree of fineness. And the baking coating system is taken as an example hereafter, as shown in FIG. 2B, the color paint 20 includes a toner powder 210 of many different colors, a filler 220, a saturated polyester resin solid content 230, an acrylic resin solid content 240, and an amino resin solid content 250. Color pastes can be formed by the toner powder 210 and the saturated polyester resin solid content 230 in different ratios. The filler 220 makes the color paint 20 to display different colors and luster, or different surface smoothness and effects, for example, the addition of a pearl powder makes the painted surface to display pearly luster, and so on. The filler 220 can also affect the physical and chemical properties of the color paint 20, and the fillers 220 may interact with one another in the color paint 20. The solid content is the percentage of the solute (non-volatile matter) per unit weight, that is:

$$\text{solid content} = \frac{\text{solute}}{(\text{solute} + \text{solvent})} \times 100\%$$

For different the color paint 20 of coated objects, desired physical and chemical properties suitable for the color paint of coated objects are required to be found out, while the mix ratios of the physical and chemical properties are necessary to be obtained through pre-experiments. The data of the color paint 20 formulas are recorded and stored in a database 310 according to the restrictive conditions of the paint system 10 and physical and chemical properties corresponding to the coated objects and the mix ratio of the color paint 20 formula in the paint system 10, so as to be used as a basis for adjustment. The database 310 may be various storage media stored in the local port, such as a hard disk (HD), a compact disc (CD), and so on. The database 310 is a relational database and includes the restrictive conditions and the proportion of the contents in each paint system 10 and the relationship between the contents.

Figure 3:
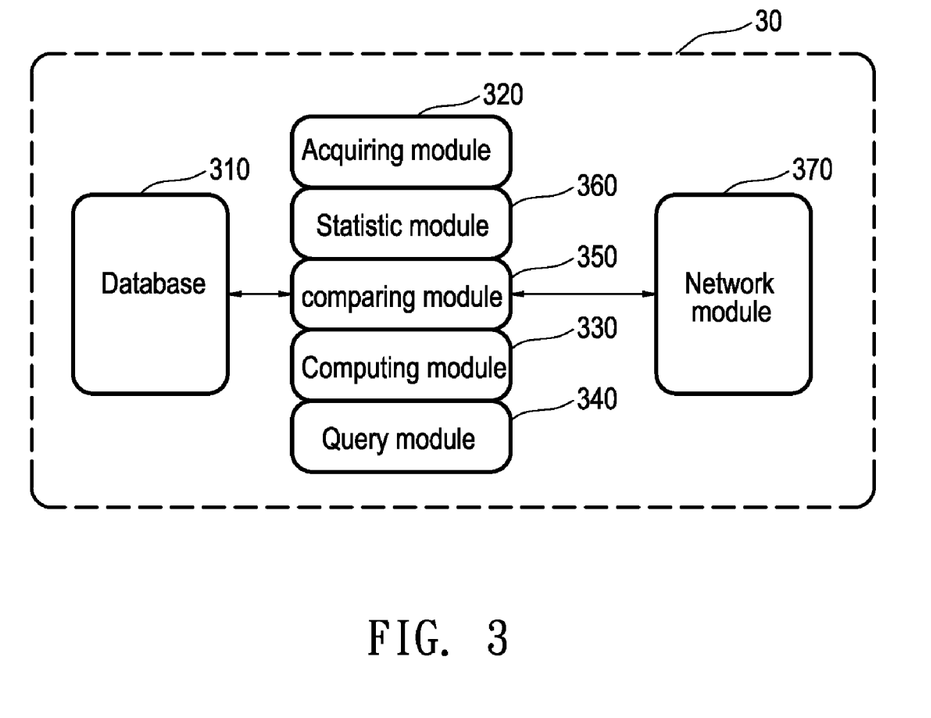
FIG. 3 is an architectural view of a system of the present invention.

Therefore, FIG. 3 is an architectural view of a color paint formula adjusting system 30 of the present invention. The execution of the system can be realized on a single computer, or through a network server. The user can log onto the server for providing the color paint formula adjusting system 30 from the computer terminal through a wired or wireless network. When receiving a log-on request of the user, the network module 370 authenticates the account and password input by a user. After authentication is passed, the user can select and set the paint system 10 and the color paint of coated object, as showed in FIG. 1.

Figure 4A:
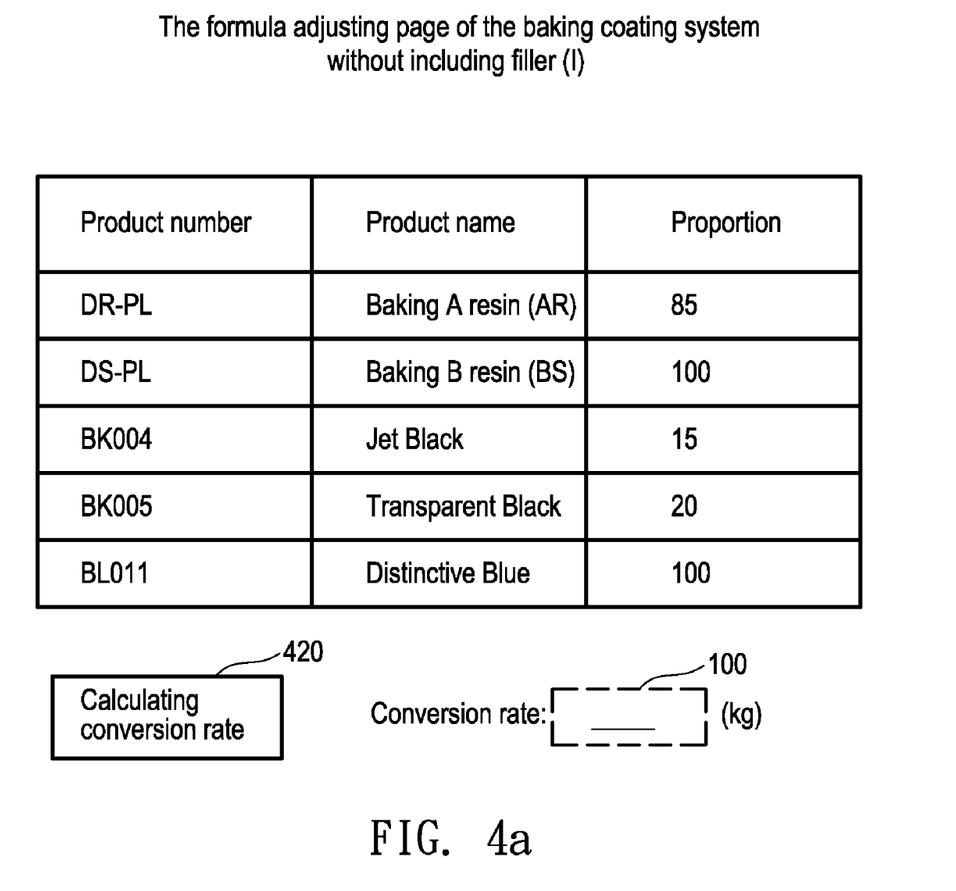
FIGS. 4a and 4b are schematic views of an adjusting page of a formula free of fillers according to an embodiment of the present invention.
Figure 6:
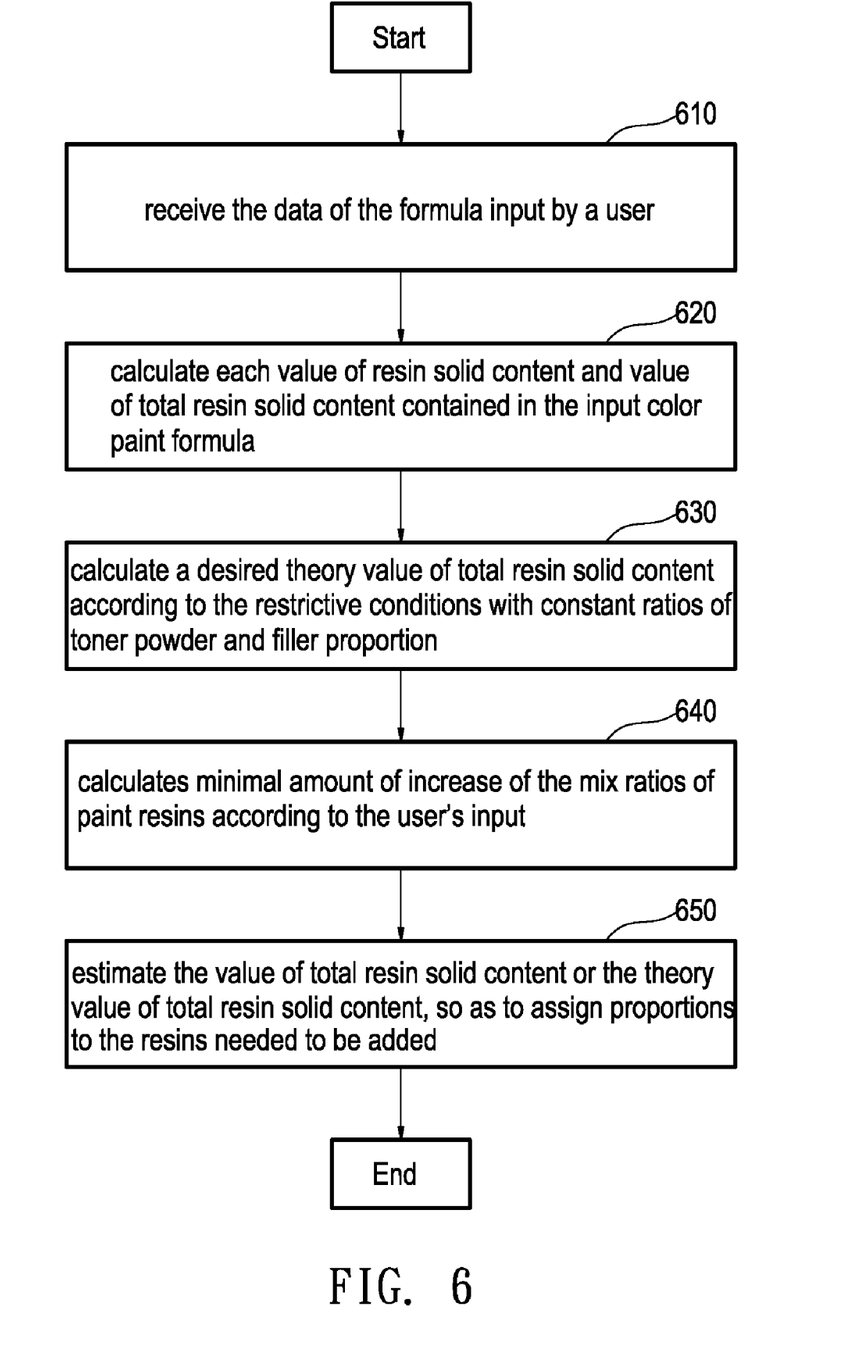
FIG. 6 is a flow chart of a method of the present invention.

After selecting and setting are completed, as showed in FIG. 4a, "product number", "product name", and "ratio" for being used in the selected paint system are displayed on the display screen for the user, as well as "price" of every product as a reference to the user. Then, after the user clicks a "Calculating conversion rate" icon 420, the proportions are input in the "proportion field" of each formula to be added, and the total amount to be formulated and the unit of the amount are also input in the "conversion rate field" 100. FIG. 6 is a flow diagram of the method of the present invention. Referring to FIG. 6, first, the amount and unit of each of the color paint 20 formula input by the user in the display are received by the acquiring module 320 (step 610). For example, "85" is input in the proportion field of a baking A resin (AR), "100" is input in the proportion field of a baking B resin (BS).

Next, the query module 340 calculates the amounts of the toner powder and the saturated polyester resin solid content contained in each of the color paint, that is, according to the color paint 20 formula selected by the user, the data of the formula, for example, the individual proportion of toner powder 210 and the saturated polyester resin solid content 230 contained in the jet black color paste, is queried from the database 310, so as to calculate their amounts in the color paint input by the user respectively (step 620). Since the color of paint is determined by the amounts of the toner powder 210 and filler, the hue of paint will not be changed by adjusting other resins when the amounts of the toner powder 210 and filler are kept constant. However, the resin amounts will affect the physical and chemical properties of paint, that is, the proportions of the saturated polyester resin solid content 230, the acrylic resin solid content 240, and the amino resin solid content 250 must be restricted in a certain proportions. Furthermore, the interaction between the fillers 220 will affect the change of the physical and chemical properties of the color paint 20 to be formulated.

Figure 7:
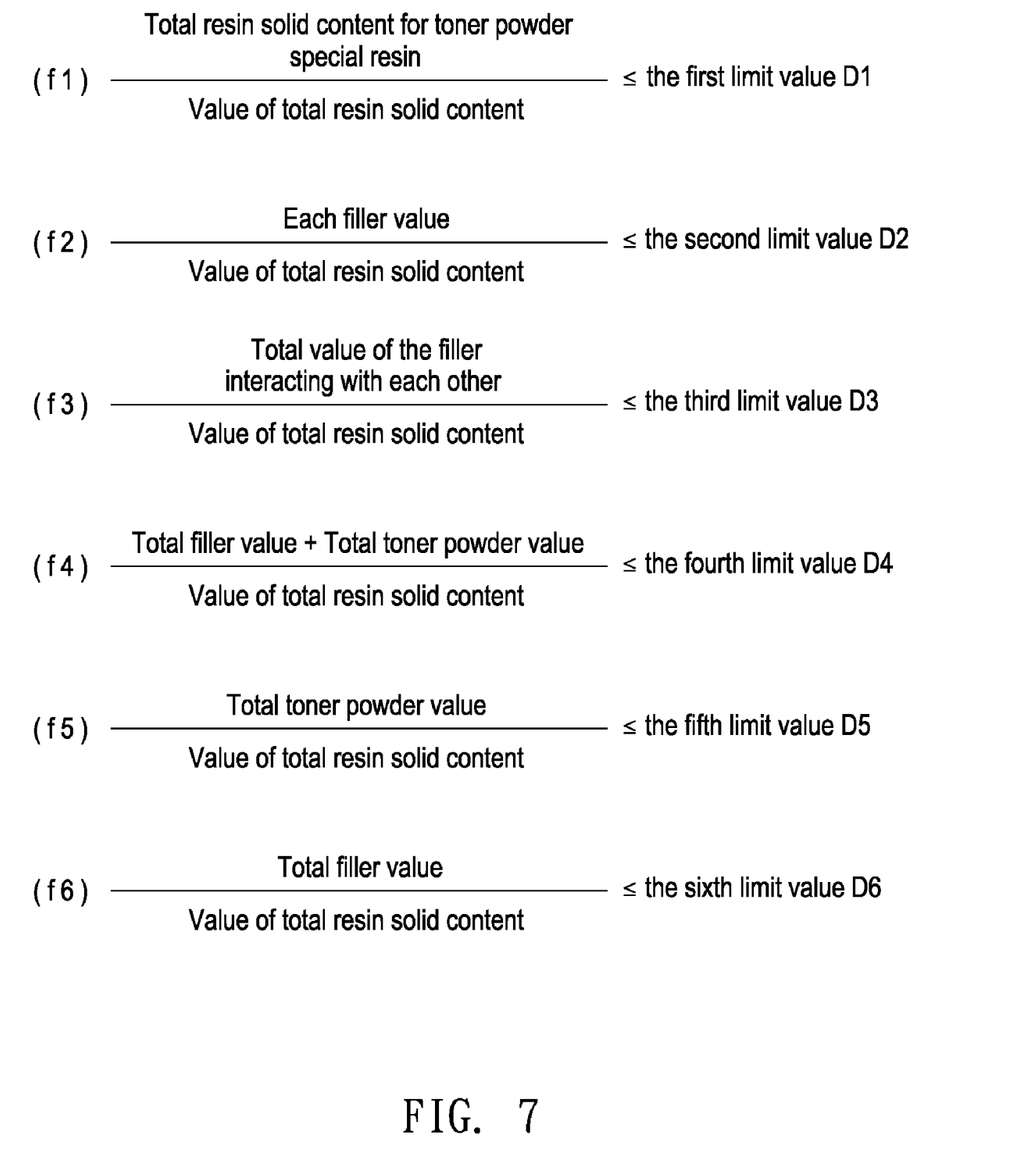
FIG. 7 is a schematic view of restrictive conditions of the present invention.

The query module 340 queries not only the compositions of the color paste but also the restrictive conditions of the compositions of the color paint 20, i.e. (f1) to (f6), as showed in FIG. 7, in which the first limit value D1, the second limit value D2, the third limit value D3, the fourth limit value D4, the fifth limit value D5, and the sixth limit value D6 are obtained through experiments. According to the restrictive conditions obtained by the query module 340, when the theory value of the total resin solid contents input by the user is calculated (step 630), the statistic module 360 calculates a plurality of statistic values, such as the total resin solid content value for toner powder 210 special resin, each filler 220 value, total value of the filler 220 interacting with each other, the total filler 220 value+the total toner powder 210 value, the total toner powder 210 value, the total filler 220 value and so on, and a plurality of the ratio values obtained by comparing those statistic values with the value of total resin solid content; in addition, the comparing module 350 determines whether each ratio value is less than or equal to the limit value according to the comparison of the ratio vales with the corresponding restrictive conditions obtained from the acquiring module 340.

The equations of the above mentioned ratio values are:

$$\frac{\text{Total resin solid content value for toner powder special resin}}{\text{Value of total resin solid content}},$$

$$\frac{\text{Each filler value}}{\text{Value of total resin solid content}},$$

-continued $$\frac{\text{Total value of the filler interacting with each other}}{\text{Value of total resin solid content}},$$

$$\frac{\text{Total filler value} + \text{Total toner powder value}}{\text{Value of total resin solid content}},$$

$$\frac{\text{Total toner powder value}}{\text{Value of total resin solid content}}, \text{ and}$$

$$\frac{\text{Total filler value}}{\text{Value of total resin solid content}}.$$

Wherein the equation of each restrictive condition is utilised by each statistic value to calculate and obtain each theory value of total resin solid content corresponding to each statistic value. In addition, the largest value among the 1~6 theory values is the theory value of total resin solid content. The equation is $$\frac{\text{Statistic value}}{\text{Theory value of total resin solid content}} = \text{Limit value.}$$

And the equation can also be derived as:

$$\frac{\text{Total resin solid content value for toner powder special resin}}{\text{Theory value 1 of total resin solid contnet}} =$$

the first limit value $D1$, $$\frac{\text{Each filler value}}{\text{Theory value 2 of total resin solid content}} =$$

the second limit value $D2$, $$\frac{\text{Total value of the filler interacting with each other}}{\text{Theory value 3 of total resin solid content}} =$$

the third limit value $D3$, $$\frac{\text{Total filler value} + \text{Total toner powder value}}{\text{Theory value 4 of total resin solid content}} =$$

the fourth limit value $D4$, $$\frac{\text{Total toner powder value}}{\text{Theory value 5 of total resin solid content}} = \text{the fifth limit value } D5,$$

$$\frac{\text{Total filler value}}{\text{Theory value 6 of total resin solid content}} = \text{the sixth limit value } D6.$$

Figure 4B:
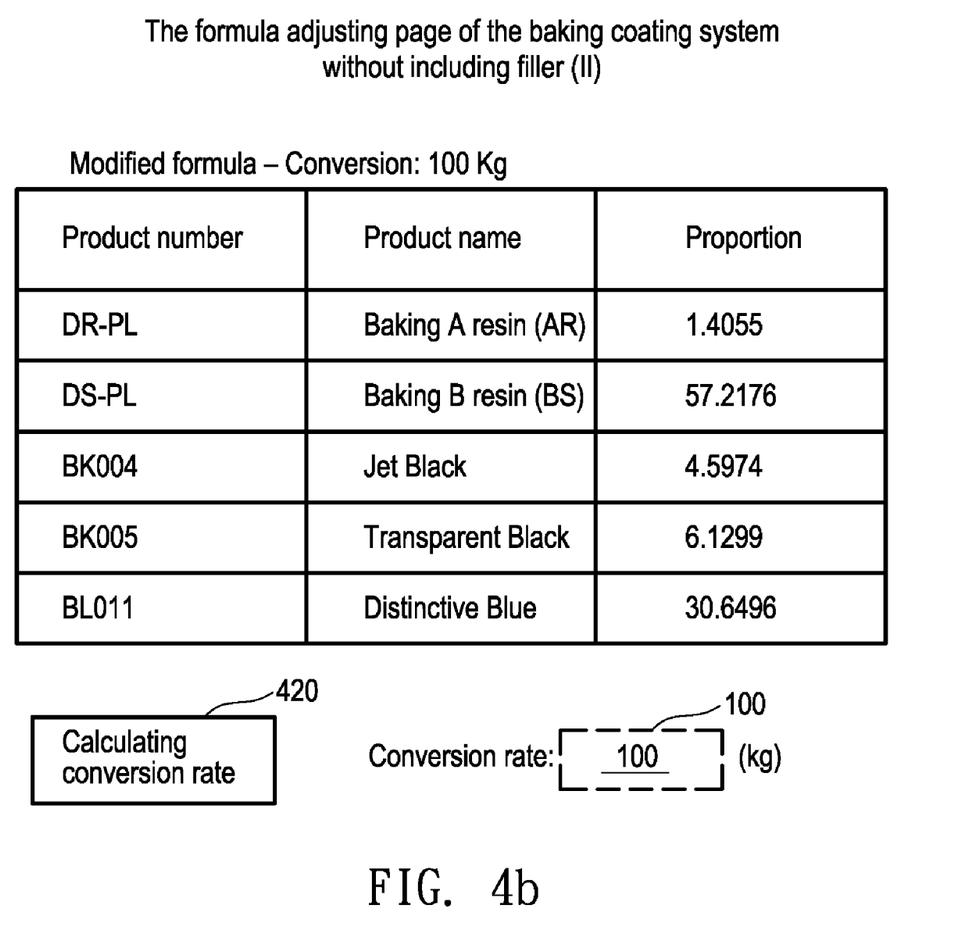

If not all of the ratio values calculated by the statistic module 360 is less than or equal to the limit value, the total resin solid content proportion must be adjusted (increased) appropriately. If none of the restrictive conditions in (f1) to (f6) is satisfied, the mix ratios can be increased according to the mix ratios of the acrylic resin solid content 240 and the amino resin solid content 250 recorded in the database 310. The computing module 330 calculates adjustment values which satisfy the restrictive conditions with minimal amount of increase of the two mix ratios, to get the optimal mix ratios (step 640), and the desired adding amounts of each formula of the user are obtained according to the formula ratios. As showed in FIG. 4b, after being adjusted by the system of the present invention, the "proportion field" shows the total amount is 100 kg (as showed in FIG. 4b), and at this time, the value of total resin solid content input by the user or the theory value of total resin solid content is estimated assign proportions of the resins to be added (step 650). That is, when the amounts of toner powder and the amounts of filler of the color paint input by the user are kept constantly, the query module 340 calculates the theory value of total resin solid content.

Figure 5A:
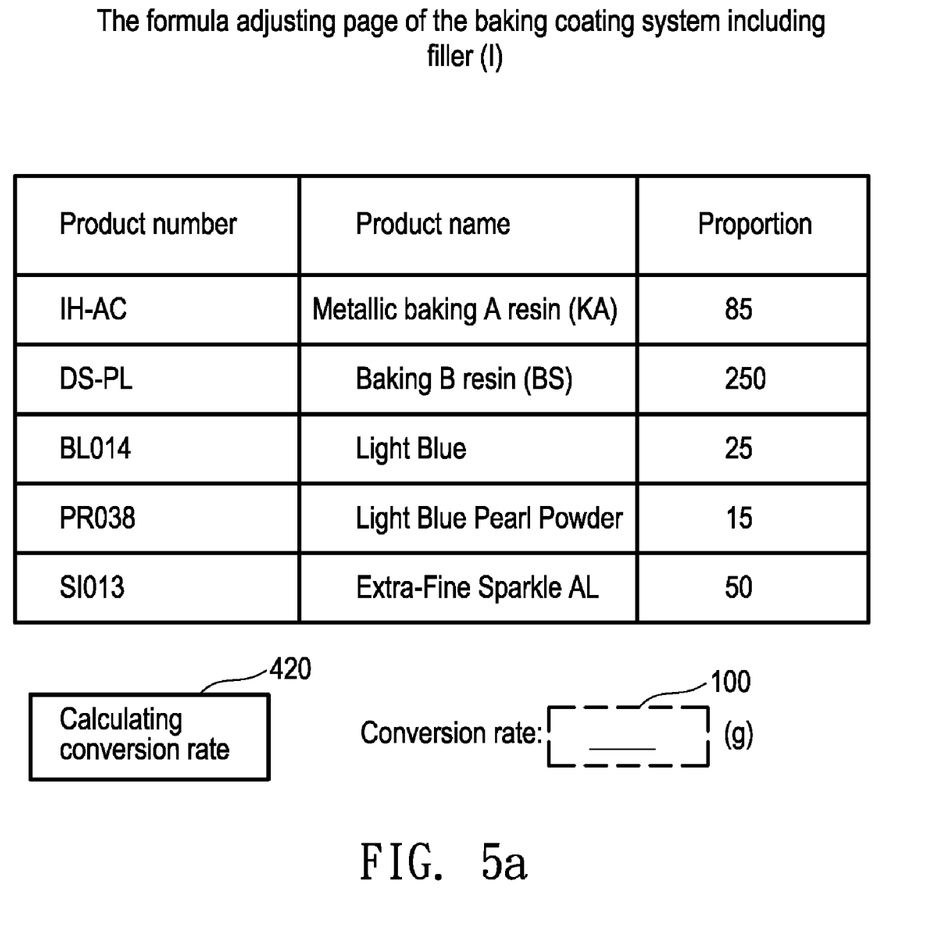
FIGS. 5a and 5b are schematic views of an adjusting page of a formula containing fillers according to an embodiment of the present invention.
Figure 5B:
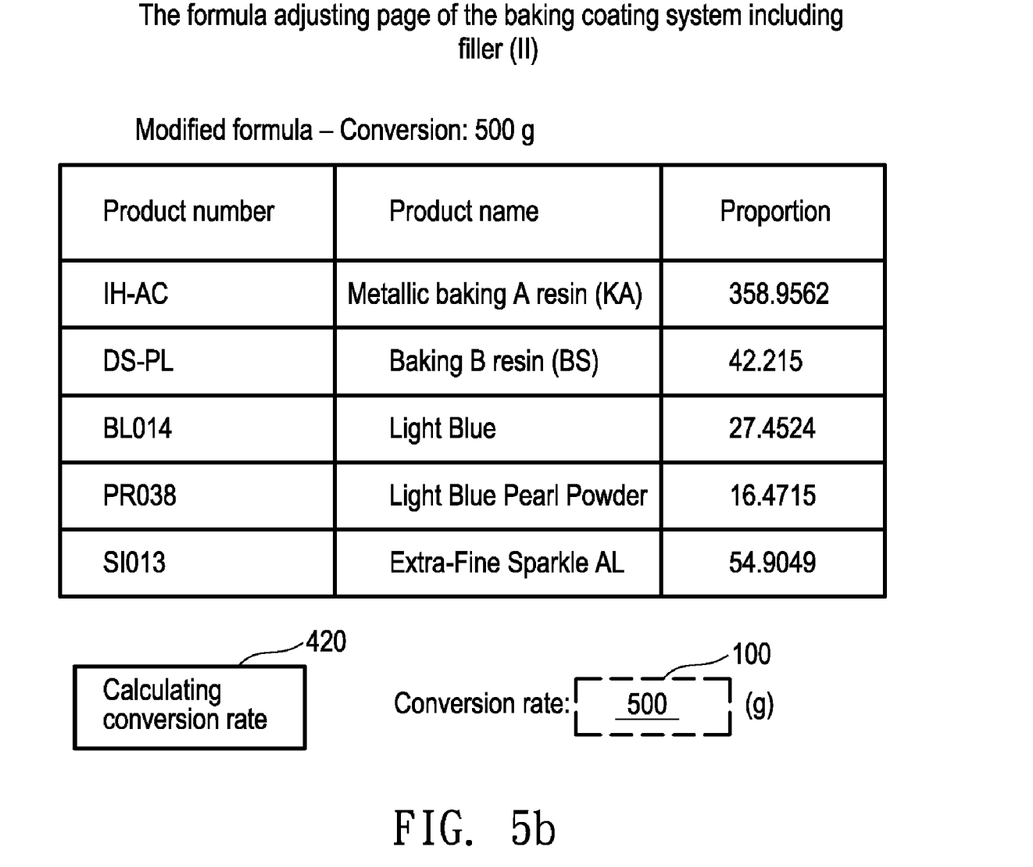

Accordingly, based on the mixing ratio of each color paint formula, the value of total resin solid content or the theory value of total resin content is utilised to calculate each adjustment value according to individual specific ratio among the resins, so as to assign the ratio and amount of the additive resin. FIGS. 5a and 5b are schematic views of an adjusting page of a formula containing fillers 220 according to an embodiment of the present invention.

The baking coating system is taken as the embodiment for explaining the operation of system and the method for the system only. The operation and method can be applied to any paint system of the present invention and are not limit to the above mentioned baking coating system; therefore, unnecessary details are not given here.

By using the systems of the present invention, the user merely needs the color paste corresponding to the system of the present invention in coordination with any resin in the system for adjusting color. After the color adjustment is finished, the user merely needs to input the formula ratios and a total amount of the color paint to be compounded, then after calculating with the method, content amounts of color paint formulas that satisfying the restrictive conditions of physical and chemical properties can be obtained, without repeated trial-and-error or experience. It is easy to operate, and waste of cost due to improper compounding is avoided, and furthermore, it satisfies the restrictive conditions of physical and chemical properties more precisely.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A color paint formula adjusting system, comprising a setting of a plurality of paint systems and color paints coating to a plurality of different material coated objects, comprising:
    a database, for storing data of a plurality of color paint formulas, a plurality of restrictive conditions according to physical and chemical properties of each paint system and each color paint of coated object, and a mix ratio of the plurality of color paint formulas of each paint system;
    an acquiring module, for acquiring a plurality of amounts and units of each color paint formula input by a user;
    a query module, for querying the data of each color paint formula input by the user, data of specific ratios among resins of the color paints of corresponding paint system and color paint of coated object, and the restrictive conditions of each color paint formula input by the user in the database, wherein the restrictive conditions include:

$$\frac{\text{Total resin solid content value for toner powder special resin}}{\text{Value of total resin solid content}} \leq$$

a first limit value, $$\frac{\text{Each filler value}}{\text{Value of total resin solid content}} \leq \text{a second limit value,}$$

$$\frac{\text{Total value of the filler interacting with each other}}{\text{Value of total resin solid content}} \leq$$

a third limit value, $$\frac{\text{Total filler value} + \text{Total toner powder value}}{\text{Value of total resin solid content}} \leq \text{a fourth limit value,}$$

-continued $$\frac{\text{Total toner powder value}}{\text{Value of total resin solid content}} \leq \text{a fifth limit value, and}$$

$$\frac{\text{Total filler value}}{\text{Value of total resin solid content}} \leq \text{a sixth limit value,}$$

and make a calculation to obtain a theory value of total resin solid content of each input color paint formula, that is, when $$\frac{\text{Total resin solid content value for toner powder special resin}}{\text{Theory value 1 of total resin solid contnet}} = \text{the first limit value,}$$

$$\frac{\text{Each filler value}}{\text{Theory value 2 of total resin solid content}} = \text{the second limit value,}$$

$$\frac{\text{Total value of the filler interacting with each other}}{\text{Theory value 3 of total resin solid content}} = \text{the third limit value,}$$

$$\frac{\text{Total filler value} + \text{Total toner powder value}}{\text{Theory value 4 of total resin solid content}} = \text{the fourth limit value,}$$

$$\frac{\text{Total toner powder value}}{\text{Theory value 5 of total resin solid content}} = \text{the fifth limit value, and}$$

$$\frac{\text{Total filler value}}{\text{Theory value 6 of total resin solid content}} = \text{the sixth limit value,}$$

wherein a largest value among the 1 to 6 theory values is the theory value of total resin solid content;

a statistic module, for calculating and obtaining the plurality of statistic values of the total resin solid content value for toner powder special resin, each filler value, the total value of the filler interacting with each other, the sum value of total filler value plus total toner powder value, the total toner powder value, and the total filler value according to the data of each color paint formula with the amount of each color paint formula input by the user, and those statistic values and the value of total resin solid content are compared to obtain a plurality of ratio values of $$\frac{\text{Total resin solid content value for toner powder special resin}}{\text{Value of total resin solid content}},$$

$$\frac{\text{Each filler value}}{\text{Value of total resin solid content}},$$

$$\frac{\text{Total value of the filler interacting with each other}}{\text{Value of total resin solid content}},$$

$$\frac{\text{Total filler value} + \text{Total toner powder value}}{\text{Value of total resin solid content}},$$

$$\frac{\text{Total toner powder value}}{\text{Value of total resin solid content}}, \text{ and}$$

$$\frac{\text{Total filler value}}{\text{Value of total resin solid content}};$$

a comparing module, for determining if each ratio value satisfies each restrictive condition of the physical and chemical properties by comparing each ratio value with the corresponding restrictive condition obtained from the query module, that is, determining whether $$\frac{\text{Total resin solid content value for toner powder special resin}}{\text{Value of total resin solid content}}$$

is less than or equal to the first limit value; whether $$\frac{\text{Each filler value}}{\text{Value of total resin solid content}}$$

is less than or equal to the second limit value; whether $$\frac{\text{Total value of the filler interacting with each other}}{\text{Value of total resin solid content}}$$

is less than or equal to the third limit value; whether $$\frac{\text{Total filler value} + \text{Total toner powder value}}{\text{Value of total resin solid content}}$$

is less than or equal to the fourth limit value; whether $$\frac{\text{Total toner powder value}}{\text{Value of total resin solid content}}$$

is less than or equal to the fifth limit value; whether $$\frac{\text{Total filler value}}{\text{Value of total resin solid content}}$$

is less than or equal to the sixth limit value; and a computing module, for computing of a plurality of adjustment values of each inputting formula according to the mix ratio of each color paint formula, wherein among the paint systems and the color paints of coated objects, each resin has its specific ratio; when amounts of toner powder and filler of a color paint input by the user are kept constantly, the plurality of statistic values of the total resin solid content value for toner powder special resin, each filler value, the total value of the filler interacting with each other, the sum value of total filler value plus total toner powder value, the total toner powder value, and the total filler value are calculated by the statistic module; then those statistic values and the value of total resin solid content are then compared, so as to obtain a plurality of ratio values; the comparing module then determines whether each ratio value is less than or equal to each limit value, if not, the theory value of total resin solid content is calculated by the query module; then among the resins under with specific ratios, the adjustment values of each inputting formula is calculated according to the mix ratio of each color paint formula by the value of total resin solid content or the theory value of total resin solid content.

2. The system according to claim 1, further comprises a network module, for receiving logging-in of a plurality of users from a network system and determining authentication data of each user.

3. The system according to claim 1, wherein the database is a relational database.

4. The system according to claim 1, wherein the paint system comprises a PU paint system, a baking coating system, an epoxy paint system, a thermoplastic acrylic resin paint system, a nitrocellosolve paint system, or any combination thereof.

5. The system according to claim 1, wherein the data of each color paint formula comprises one or more toner powder, one or more filler, one or more toner powder special resin, one or more resin corresponding to that of the paint systems, or any combination thereof.

6. The system according to claim 1, wherein each limit value is obtained through pre-experiments.

7. A method for adjusting a color paint formula, applicable in a database with data of a plurality of color paint formulas, a plurality of restrictive conditions of physical and chemical properties corresponding to each paint system and each color paint of coated object, and a plurality of mix ratios of color paint formulas for each paint system stored therein, comprising:
   acquiring a paint system and a color paint of coated object selected by a user and a plurality of amounts and units of each color paint formula input by the user;
   inputting each color paint formula according to the paint system and the color paint of coated object selected by the user, querying the data and each restrictive condition of each color paint formula of the paint system and the color paint of coated object in the database, and calculating each theory value of total resin solid content of each color paint formula;
   integrating into a plurality of statistic values and a value of total resin solid content according to the data of each color paint formula, so as to calculate a plurality of ratio values;
   determining whether each ratio value satisfies each restrictive condition of the physical and chemical properties according to each acquired restrictive condition comparing with each corresponding ratio value; and
   estimating a plurality of adjustment values according to the mix ratio of each color paint formula and the value of total resin solid content or the theory value of total resin solid content under keeping the amount of toner powder and the amount of filler of each color paint input by the user constantly.

8. The method according to claim 7, wherein the statistic values comprise a total resin solid content value for toner powder special resin, a filler value, a total value of the fillers interacting with each other, a sum value of total toner powder value plus the total filler value, a total toner powder value, and a total filler value.

9. The method according to claim 8, wherein the mixing ratios are calculated and obtained with a plurality of equations applied to each statistic value and each value of total resin solid content, wherein the equations include:

$$\frac{\text{Total resin solid content value for toner powder special resin}}{\text{Value of total resin solid content}},$$

$$\frac{\text{Each filler value}}{\text{Value of total resin solid content}},$$

$$\frac{\text{Total value of the filler interacting with each other}}{\text{Value of total resin solid content}},$$

$$\frac{\text{Total filler value} + \text{Total toner powder value}}{\text{Value of total resin solid content}},$$

$$\frac{\text{Total toner powder value}}{\text{Value of total resin solid content}}, \text{ and}$$

$$\frac{\text{Total filler value}}{\text{Value of total resin solid content}}.$$

10. The method according to claim 8, wherein the theory value of total resin solid content is a largest theory value of total resin content among a plurality of theory values of total resin solid content which are calculated and obtained by using an equation of $$\frac{\text{Statistic value}}{\text{Theory value of total resin solid content}} = \text{limit value},$$

and the limit value is a pre-stored experiment value of each restrictive condition in the database.

11. The method according to claim 7, wherein each restrictive condition comprises a plurality of equations of $$\frac{\text{Statistic value}}{\text{Value of total resin solid content}} \leq \text{Limit value},$$

wherein the limit value is a pre-stored experiment value of each restrictive condition in the database.

12. The method according to claim 11, wherein the equations for restrictive conditions are $$\frac{\text{Total resin solid content value for toner powder special resin}}{\text{Value of total resin solid content}} \leq \text{a first limit value};$$

$$\frac{\text{Each filler value}}{\text{Value of total resin solid content}} \leq \text{a second limit value};$$

$$\frac{\text{Total value of the filler interacting with each other}}{\text{Value of total resin solid content}} \leq \text{a third limit value};$$

$$\frac{\text{Total filler value} + \text{Total toner powder value}}{\text{Value of total resin solid content}} \leq \text{a fourth limit value};$$

$$\frac{\text{Total toner powder value}}{\text{Value of total resin solid content}} \leq \text{a fifth limit value};$$

$$\frac{\text{Total filler value}}{\text{Value of total resin solid content}} \leq \text{a sixth limit value}.$$

13. The method according to claim 11, wherein each limit value is obtained through pre-experiments.

14. The method according to claim 7, wherein the step of estimating a plurality of adjustment values is determined by whether each mixing ratio of each color paint formula satisfies each restrictive condition, if not, each of the theory values of total resin solid content is calculated, and then among resins under with specific ratios, adjustment values of each inputting formula is calculated according to the value of total resin solid content or the theory value of total resin solid content.

* * * * *